PAUL J. DANCIK
INVENTOR.

May 17, 1960

P. J. DANCIK 2,936,967

CONVERTIPLANE

Filed Dec. 28, 1956

PAUL J. DANCIK
INVENTOR.

BY
ATTORNEY

May 17, 1960

P. J. DANCIK 2,936,967

CONVERTIPLANE

Filed Dec. 28, 1956

PAUL J. DANCIK
INVENTOR.

BY

ATTORNEY

United States Patent Office 2,936,967
Patented May 17, 1960

2,936,967
CONVERTIPLANE

Paul J. Dancik, Media, Pa., assignor to Vertol Aircraft Corporation, Morton, Pa., a corporation of Pennsylvania Application December 28, 1956, Serial No. 632,617

20 Claims. (Cl. 244—7)

This invention relates to convertiplanes and more particularly to a convertiplane of the tilting wing type and to a control system therefor.

It is an object of the present invention to utilize conventional ailerons, elevator and rudder for control of the aircraft in normal airplane flight, during which time the controls for hovering and/or vertical flight may or may not be functioning. It is a further object to utilize variable thrust producing means on both sides of the longitudinal axis of the aircraft for propulsive thrust during airplane flight and for lifting thrust and roll control of the aircraft during hovering and vertical flight. It is a further object to utilize horizontally and vertically directed variable thrust producing means for yaw and pitch control during such flight, during which time the controls for airplane flight may or may not be functioning. It is a still further object to utilize the normal aircraft control stick to control the lifting thrust producing means for roll control of the aircraft during hovering and vertical flight by lateral displacement of said control stick, and to control the vertically directed thrust producing means for pitch control of the aircraft during such flight by longitudinal displacement of said control stick. It is a still further object to utilize the normal aircraft rudder pedals to control the horizontally directed thrust producing means for yaw control of the aircraft during hovering and vertical flight. A still further object is to provide means for "washing-out" the control of all or certain of said airplane control instrumentalities, i.e., the ailerons, elevator and rudder, during hovering or vertical flight and/or "washing-out" all or certain of said hovering and vertical flight control means during airplane flight. Other objects and advantages of the invention will become apparent from the following description taken in conjunction with the accompanying drawings in which:

Figures 3A, 4:
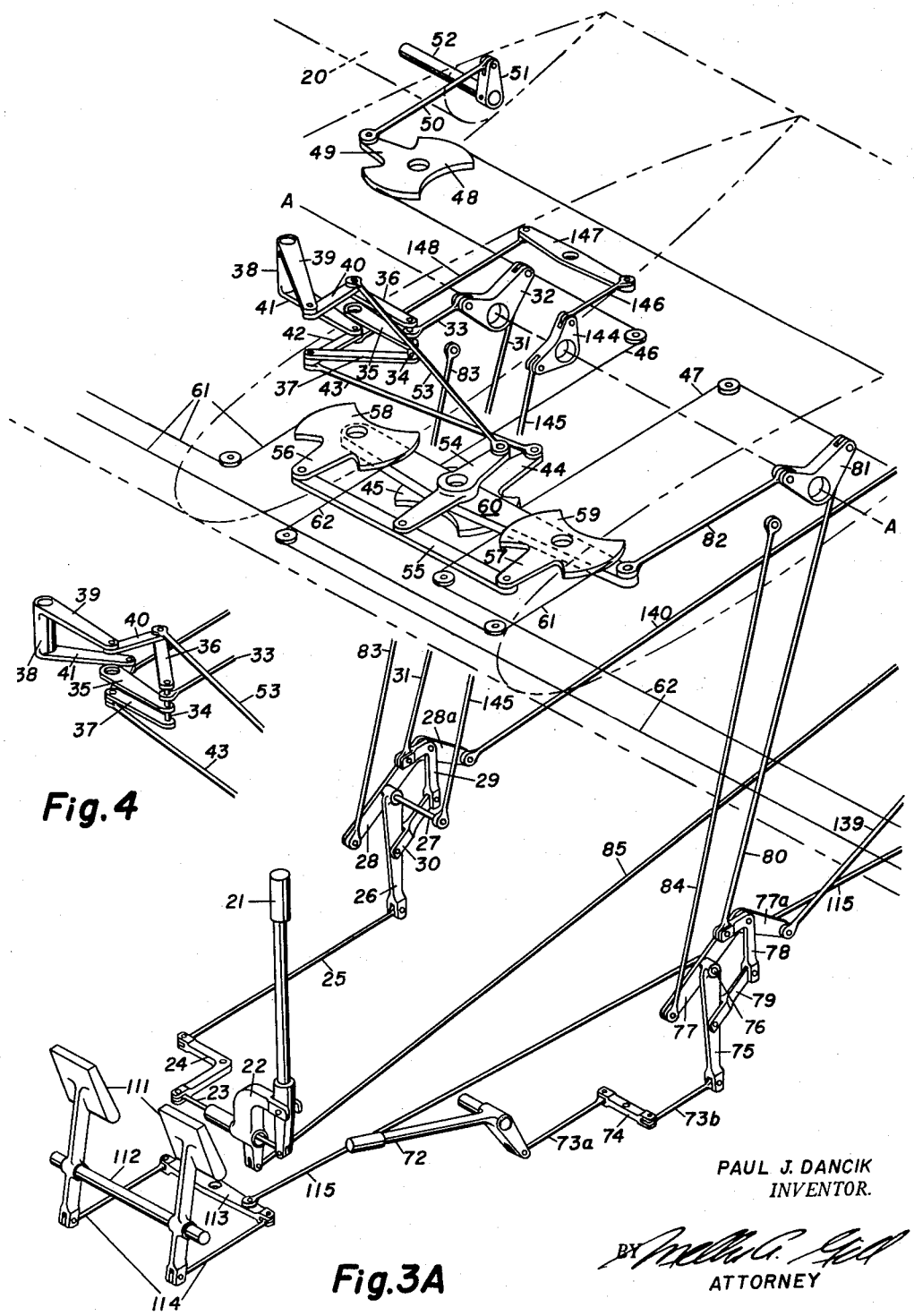
Figure 3B:
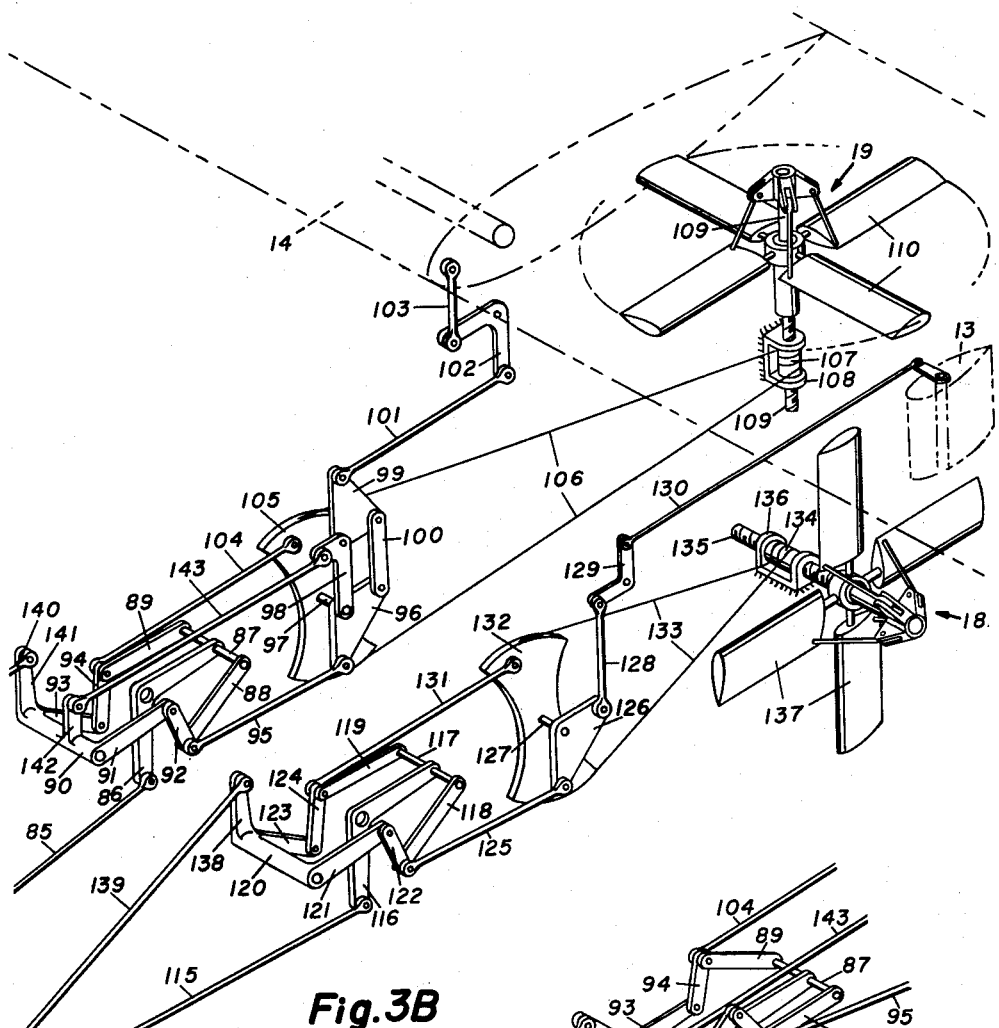
Figure 5:
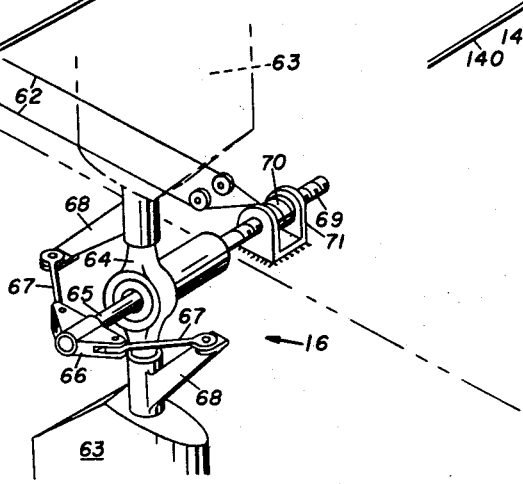
Figure 5:
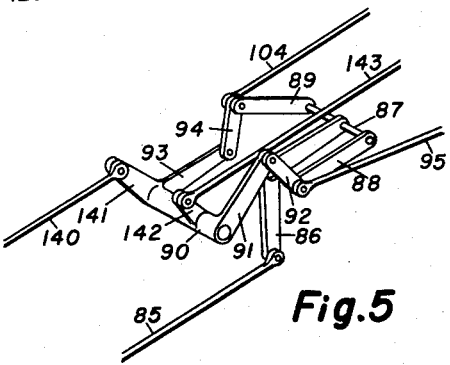

Fig. 3A and 3B combined form a diagrammatic perspective view of the flight control system;

Fig. 4 is a perspective view of the aileron-propeller pitch control changeover mechanism in the hovering and vertical flight position; and Fig. 5 is a perspective view of the elevator-fan pitch control changeover mechanism in the hovering and vertical flight position.

Figure 1:
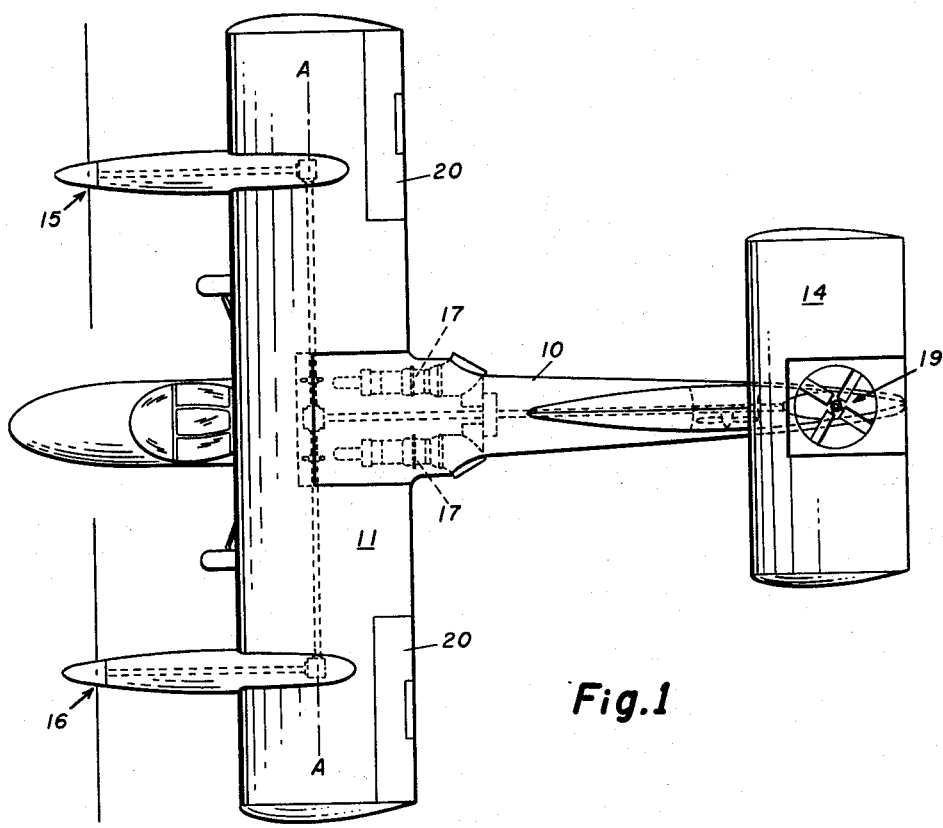
Fig. 1 is a plan view of an aircraft embodying the invention and illustrating the wing and propeller systems thereof in position for normal airplane flight.
Figure 2:
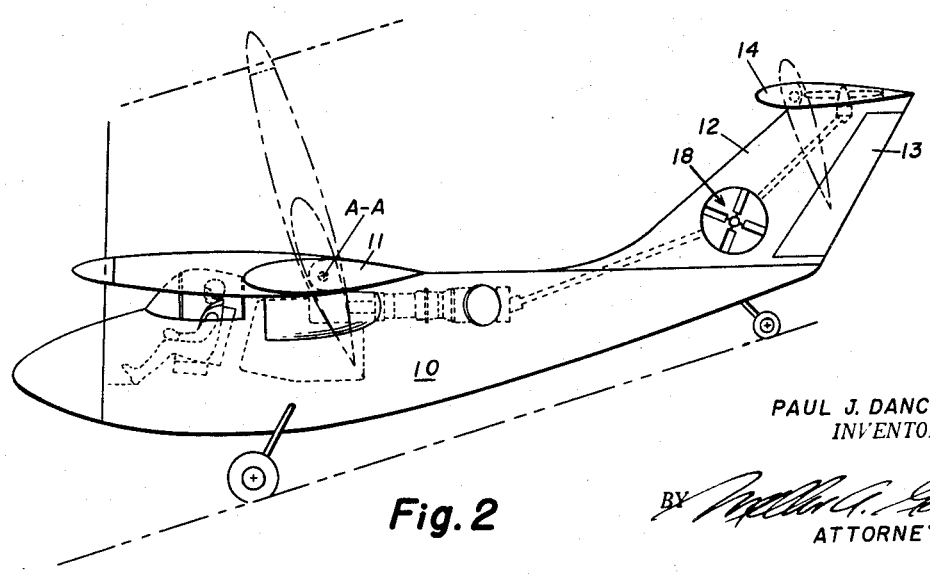
Fig. 2 is a side elevation of the aircraft showing in dotted lines the position of the wing and propeller systems and the elevator for hovering and vertical flight.

As shown in Figs. 1 and 2, the aircraft consists of a fuselage 10 having a wing 11 pivotally attached thereto for rotation about axis A—A and being provided with an empennage including a vertical fin 12, a rudder 13 and an elevator 14. The wing 11 is provided with ailerons 20 and carries starboard and port thrust producing means such as propellers 15 and 16, which propellers are driven through associated gearing and shafting by an engine or engines 17 preferably of the turbine type. The engine or engines also drive vertically and horizontally directed thrust producing means such as fans 18 and 19 which are carried by the empennage and are mounted for yaw and pitch control, respectively.

Referring now to Figs. 3A and 3B, the pilot's control stick 21 is pivotally mounted for lateral movement on a bracket member 22 which in turn is journalled in bearings for rotation about a transverse axis. A link 23 extends through the hollow shaft portion of the bracket member 22 and is attached at one end to the lower end of the pilot's control stick 21 and at the other end to a bellcrank 24. A link 25 is attached to the other arm of the bellcrank 24 and is connected at its other end to a lever 26 pivotally mounted on fuselage structure by means of a pin 27. A lever 28, also pivotally mounted on fuselage structure by means of pin 27, and having an offset extension 28a, pivotally supports a bellcrank 29. A link 30 connects lever 26 with one arm of bellcrank 29 while a link 31 connects the other arm of the bellcrank 29 with a bellcrank 32 loosely supported on the wing tilt axis A—A. A link 33 extends forwardly from the other arm of bellcrank 32 to a pin 34 carried on the end of a lever 35 which is pivotally mounted to swing structure by means not shown. Pin 34 pivotally supports two links 36 and 37 of equal length and of length equal to that of the lever 35. Pivotally mounted to wing structure is a bellcrank member 38 having one arm 39 connected to link 36 by means of a link 40 and the other arm 41 connected to link 37 by means of a link 42. Extending from the pivotal connection of links 37 and 42 is a link 43 which is pivotally connected to arm 44 of the aileron cable quadrant 45 from which extend cables 46 and 47. Cables 46 and 47 pass over pulleys and connect to cable quadrants associated with each aileron 20. The cable quadrant 48 is provided with an arm 49 to which is pivotally connected a link 50 which in turn is pivotally connected to a crank 51 fixedly attached to the torque tube 52 upon which is carried the aileron 20.

Extending from the pivotal connection of links 36 and 40 is a link 53 which is pivotally connected to a lever 54, the other end of which is pivotally connected to a tie bar 55. The ends of the tie bar 55 are pivotally connected to arms 56 and 57 of propeller pitch quadrants 58 and 59 which are pivotally mounted upon a lever bar 60. Cables 61 and 62 extend from the propeller pitch quadrants to the port and starboard propellers.

Each propeller is provided with variable pitch blades 63 carried by a hub 64 through which extends a rod 65 provided on one end with a cross bar member 66 to which are pivotally connected links 67 which in turn pivotally connect to pitch arms 68 provided on each blade 63. The other end of rod 65 is provided with a screw thread 69 which engages the threads of an associated nut member 70 around which is wrapped the cable 62 and which is supported against axial movement by a bracket 71 attached to wing structure.

The collective pitch lever 72 is journalled in bearings for rotation about a transverse axis while the lower extension thereof is connected by means of links 73a and 73b and a lever 74 to a lever 75 pivotally mounted on fuselage structure at 76. A lever 77 having an offset extension 77a and also pivotally mounted on fuselage structure at 76, pivotally supports a bellcrank 78. A link 79 connects lever 75 with one arm of bellcrank 78 while a lnik 80 connects the other arm of bellcrank 78 with a bellcrank 81 loosely supported on the wing tilt axis A—A. Link 82 extends forwardly from the other arm of the bellcrank 81 and is pivotally attached to one end of the lever bar 60. Links 83 and 84 are pivotally attached at their upper ends to wing structure forward of the wing tilt axis A—A and are pivotally attached at their lower ends to the forward ends of levers 28 and 77 respectively, the purpose of which will be hereinafter explained.

The lower extension of bracket member 22 is pivotally connected to a link 85 which extends rearwardly for connection to one arm of bellcrank 86 which is pivotally mounted to fuselage structure by means not shown. A pin or shaft 87 is carried by the other arm of bellcrank 86 and pivotally supports two links 88 and 89 of equal length and of length equal to that of the associated bellcrank arm. Pivotally mounted to fuselage structure is a bellcrank member 90 having one arm 91 connected to link 88 by means of a link 92 and another arm 93 connected to link 89 by means of a link 94. Extending from the pivotal connection of links 88 and 92 is a link 95 which is pivotally connected to a bellcrank member 96 pivotally mounted to fuselage structure by means of a shaft 97. Shaft 97 also supports a link 98 which in turn pivotally supports a bellcrank member 99 connected to bellcrank member 96 by a link 100 and having pivotally connected thereto a rearwardly extending link 101. Link 101 connects to one arm of bellcrank 102 while the other arm of bellcrank 102 connects to the elevator 14 ahead of its pivotal axis by means of a link 103.

Extending from the pivotal connection of links 89 and 94 is a link 104 which is pivotally connected to a quadrant member 105 pivotally mounted to fuselage structure by means of the shaft 97 and from which extends a cable 106. The cable 106 wraps around a nut member 107 which engages the threaded end of a rod 109 and which is supported against axial movement by a bracket 108 attached to fin structure. Rod 109 extends through the hub of fan 19 and connects to the adjustable pitch blades 110 of the fan in such manner that upward movement of the rod 109 causes a decrease in pitch of the blades 110.

Rudder pedals 111 are pivotally mounted upon a transverse shaft 112 and are connected to opposite sides of a pivotally mounted lever 113 by means of links 114. A link 115 is pivotally connected to lever 113 and extends rearwardly for connection to one arm of bellcrank 116 which is pivotally mounted to fuselage structure by means not shown. A pin or shaft 117 is carried by the other arm of bell crank 116 and pivotally supports two links 118 and 119 of equal length and of length equal to that of the associated bellcrank arm. Pivotally mounted to fuselage structure is a bell crank member 120 having one arm 121 connected to link 118 by means of a link 122 and another arm 123 connected to link 119 by means of a link 124. Extending from the pivotal connection of links 118 and 122 is a link 125 which is pivotally connected to a bellcrank member 126 pivotally mounted to fuselage structure by means of a shaft 127. A link 128, pivotally connected to the bellcrank member 126, connects to one arm of a bellcrank 129, while the other arm of bellcrank 129 is connected to the rudder 13 by means of a link 130.

Extending from the pivotal connection of links 119 and 124, is a link 131 which is pivotally connected to a quadrant member 132 pivotally mounted to fuselage structure by means of the shaft 127 and from which extends a cable 133. The cable 133 wraps around a nut member 134 which engages the threaded end of a rod 135 and which is supported against axial movement by a bracket 136 attached to fin structure. Rod 135 extends thru the hub of fan 18 and connects to the adjustable pitch blades 137 of the fan in such manner that outward movement of the rod 135 causes a decrease in pitch of the blades 137.

As previously indicated, link 84 is pivotally connected to lever 77, the extension 77a of which is connected to arm 138 of bellcrank 120 by means of a link 139. Similarly, a link 140 connects extension 28a of lever 28 to arm 141 of bellcrank 90. A fourth arm, 142, of bellcrank 90 is connected to link 98 by means of a link 143.

Loosely supported on the wing tilt axis A—A is a bellcrank 144, having one arm connected to fuselage structure at 27 by means of a link 145 and having its other arm connected by means of a link 146 to a lever 147 pivotally mounted on wing structure. The other end of lever 147 is connected to the pivotal connection of link 42 and arm 41 of bellcrank 38 by means of a link 148.

Still referring to Figs. 3A and 3B, wherein the control system is shown in the airplane flight position, it will be noted that the pivotal connection of links 36 and 40 and the pivotal connection of link 42 and arm 41 of bellcrank 38 are aligned with the pivotal axis of lever 35. In this position, movement of lever 35 about its pivotal axis causes no movement of link 40 and link 53 connected thereto, and lever 54 is thereby held in its neutral position. However, movement of lever 35 will cause movement of link 42 about its pivotal connection with arm 41 of bellcrank 38, and hence, movement of link 43 to thereby actuate the aileron cable quadrant 45. Similarly, it will be noted that the pivotal connection of links 89 and 94 and the pivotal connection of link 92 and arm 91 of bellcrank 90 are aligned with the pivotal axis of bellcrank 86. In this position, movement of bellcrank 86 about its pivotal axis causes no movement of link 94 and link 104 connected thereto, and quadrant 105 is thereby held in its neutral position. However, movement of bellcrank 86 will cause movement of link 92 about its pivotal connection with arm 91 of bellcrank 90, and hence, movement of link 95 to thereby actuate the elevator 14.

The linkage of the rudder-fan pitch control changeover mechanism 117—124 is aligned identically with that of the elevator fan pitch control changeover mechanism 87—94 whereby movement of bellcrank 116 about its pivotal axis causes no movement of link 124 and link 131 connected thereto, and quadrant 132 is thereby held in its neutral position. However, movement of bellcrank 116 will cause movement of link 122 about its pivotal connection with arm 121 of bellcrank 120, and hence, movement of link 125 to thereby actuate the rudder 13.

*Operation*

Lateral movement of stick 21 to the right causes counterclockwise rotation of the bellcrank 24 which through link 25 causes clockwise rotation of lever 26 about the pin 27 which in turn causes clockwise rotation of the bellcrank 29 about its pivotal mounting upon the lever 28 thereby displacing the link 31 upwardly. This causes a forward displacement of the link 33 which in turn causes clockwise rotation of the lever 35 and through the links 37 and 42 movement of the link 43 to the right. This in turn causes counterclockwise rotation of the aileron cable quadrant 45 which through cables 46 and 47 causes counterclockwise rotation of the cable quadrants 48 to thereby raise the starboard aileron 20 and lower the port aileron 20. Movement of the stick 21 to the left results in the reverse motion of the ailerons 20.

Movement of the stick 21 in the forward direction causes counterclockwise rotation of the bracket member 22 which through link 85 causes counterclockwise rotation of bellcrank 86. This in turn, through links 88 and 92 causes a rearward displacement of link 95 which results in a counterclockwise rotation of bellcrank member 96 and through link 100 a counterclockwise rotation of bellcrank member 99. Through link 101, bellcrank 102 is rotated in a clockwise direction which through link 103 lowers the elevator 14.

Movement of the right rudder pedal 111 in the forward direction causes, through link 114, clockwise rotation of lever 113 which through link 115 causes clockwise rotation of bellcrank 116. This in turn, through links 118 and 122, and link 125 pivotally connected thereto, causes clockwise rotation of bellcrank member 126 which through link 128, bellcrank 129 and link 130 deflects the rudder 13 to the right.

Upward movement of the collective pitch lever 72, acting through lever 74 and links 73a and 73b causes counterclockwise rotation of lever 75 about its pivotal mounting 76, which in turn through link 79 and bellcrank 78 pivotally mounted upon lever 77 causes downward movement of link 80. This movement of link 80 causes clockwise rotation of bellcrank 81 about axis A—A which causes link 82 to move rearwardly. This motion causes a counterclockwise rotation of lever bar 60 which in turn results in a pull on the cables 61 and 62 attached to quadrant 59 and a paying-out of the cables 61 and 62 attached to the quadrant 58. This in turn causes a rotation of the nut members 70 which through the rods 65 associated therewith results in an increase in pitch of the blades 63 of both propellers 15 and 16.

When the wing is tilted, by means not shown, to the dotted line position shown in Fig. 2 for hovering and vertical flight of the aircraft, the aileron-propeller pitch control changeover mechanism takes the position shown in Fig. 4, the elevator-fan pitch control changeover mechanism takes the position shown in Fig. 5 and the rudder-fan pitch control changeover mechanism takes a similar position, all in the following manner.

Tilting of the wing about axis A—A results in rotation of lever 147 about the axis A—A which, since the bellcrank 144 is held against rotation by link 145 and the pivotal connection of link 146 to bellcrank 144 does not move, causes a clockwise rotation of lever 147 about its pivotal axis which in turn through link 148 and its connection with arm 41 of bellcrank 38 causes a counterclockwise rotation of bellcrank 38 to the position shown in Fig. 4. In this position, the pivotal connection of links 37 and 42 and the pivotal connection of link 40 and arm 39 of bellcrank 38 are aligned with the pivotal axis of lever 35 whereby movement of lever 35 about its pivotal axis causes no movement of link 42 and link 43 connected thereto, and the aileron cable quadrant 45 is thereby held in its neutral position. However, movement of lever 35 will cause movement of link 40 about its pivotal connection with arm 39 of bellcrank 38 and hence, movement of link 53 to thereby actuate the lever 54 and through tie bar 55, the associated propeller pitch quadrants 58 and 59.

Tilting of the wing about axis A—A also results in upward movement of links 83 and 84 which through levers 28 and 77 and the links 140 and 139 cause counterclockwise rotation of the bellcranks 90 and 120 respectively. These bellcranks are thereby positioned as shown in Fig. 5 wherein the pivotal connection of links 88 and 92 and the pivotal connection of link 94 and arm 93 of bellcrank 90 are aligned with the pivotal axis of bellcrank 86 whereby movement of bellcrank 86 about its pivotal axis causes no movement of link 92 and link 95 connected thereto, and bellcrank member 96 is thereby held in its neutral position. However, movement of bellcrank 86 will cause movement of link 94 about its pivotal connection with arm 83 and hence, movement of link 104 to thereby actuate the quadrant 105 and through cable 106, the nut member 107 to effect a change in pitch of the fan blades 110. Similarly, the pivotal connection of links 118 and 122 and the pivotal connection of link 124 and arm 123 of bellcrank 120 are aligned with the pivotal axis of bellcrank 116 whereby movement of bellcrank 116 about its pivotal axis causes no movement of link 122 and link 125 connected thereto, and bellcrank member 126 is thereby held in its neutral position. However, movement of bellcrank 116 will cause movement of link 124 about its pivotal connection with arm 123 and hence, movement of link 131 to thereby actuate the quadrant 132 and through cable 133, the nut member 134 to effect a change in pitch of the fan blades 137. Counterclockwise rotation of bellcrank 90, through arm 142 and links 143 and 98 also causes a forward shift of bellcrank member 99 which through link 101, bellcrank 102 and link 103 positions the elevator 14 in the dotted line position shown in Fig. 2 for hovering and vertical flight of the aircraft.

The upward movement of links 83 and 84 during tilting of the wing about axis A—A, which causes clockwise rotation of levers 28 and 77, results in a downward shift of the bellcranks 29 and 78 which in turn causes clockwise rotation of the bellcranks 32 and 81. The length of the arm of lever 28 upon which the bellcrank 29 is pivotally mounted and the length of the arm of bellcrank 32 to which the link 31 is pivotally connected are so proportioned, and the point of attachment of the link 83 to wing structure is so located that the bellcrank 32 is rotated through the same angle that the wing is tilted whereby tilting of the wing does not cause movement of the lever 35 and any differential setting of the ailerons will be reflected in a differential pitch setting of the blades of the propellers 15 and 16 as the wing is tilted. Since, for efficient operation, a greater pitch of the propeller blades is required when acting as propulsion means than when acting as lifting means, the length of the arm of lever 77 upon which the bellcrank 78 is pivotally mounted and the length of the arm of bellcrank 81 to which the link 80 is pivotally connected are so proportioned, and the point of attachment of the link 84 to wing structure is so located that the bellcrank 81 is rotated through an angle less than that through which the wing is tilted. Accordingly, lever bar 60 is actuated in a direction to cause a decrease in pitch of the blades of both propellers as the wing is tilted to the vertical or hovering flight attitude and to cause an increase in pitch as the wing is tilted to the airplane flight attitude.

The operation of the controls during hovering and vertical flight will now be described. Lateral movement of stick 21 to the right again causes clockwise rotation of the lever 35 which, since the aileron-propeller pitch control changeover mechanism is in the position shown in Fig. 4, causes link 53 to move to the left. This in turn, through lever 54 and tie bar 55, causes a clockwise rotation of both propeller pitch quadrants 58 and 59 thereby causing a decrease in pitch of the blades of the starboard propeller 15 and an increase in pitch of the blades of the port propeller 16.

Forward movement of the stick 21 again causes counterclockwise rotation of bellcrank 86 which, since the elevator-fan pitch control changeover mechanism is in the position shown in Fig. 5, causes a forward displacement of link 104. This in turn causes counterclockwise rotation of quadrant member 105 and through cable 106, nut member 107 and threaded rod 109, an increase in pitch of the fan blades 110.

Movement of the right rudder pedal 111 in the forward direction again causes clockwise rotation of the bellcrank 116 which, since the rudder-fan pitch control changeover mechanism is in a position similar to that of the elevator-fan pitch control changeover mechanism shown in Fig. 5, causes a rearward displacement of the link 131. This in turn causes clockwise rotation of quadrant member 132 and through cable 133, nut member 134 and threaded rod 135, an increase in pitch of the fan blades 137.

Movement of the collective pitch lever 72 results in a simultaneous increase or decrease in pitch of the blades 63 of both propellers 15 and 16 in the manner set forth hereinabove.

It will be appreciated that for positions of the wing between those for airplane flight and vertical or hovering flight, the changeover mechanisms will be in positions in between those shown in Figs. 3A and 3B and those shown in Figs. 4 and 5. Accordingly, movement of the stick 21 in the fore and aft direction will result in actuation of the elevator 14 and in a pitch change of the blades 110 of the horizontal fan 19; movement of the stick 21 in the lateral direction will result in actuation of the ailerons 20 and in a differential pitch change of the blades 63 of the propellers 15 and 16, i.e., an increase in pitch of the blades of one propeller and a decrease in pitch of the blades of the other propeller; and movement of the rudder pedals 111 will result in actuation of the rudder 13 and in a pitch change of the blades 137 of the vertical fan 18. Thus, it is seen that for positions of the wing between those for airplane flight and vertical or hovering flight, both airplane and helicopter control instrumentalities are functioning and that as the helicopter or airplane control instrumentalities take over or are "washed-in," the other control instrumentalities are "washed-out."

Although shown and described in what is believed to be the most practical and preferred embodiment, it is apparent that departures from the specific apparatus shown will suggest themselves to those skilled in the art and may be made without departing from the spirit and scope of the invention. I therefore do not wish to restrict myself to the particular form of construction illustrated and described, but desire to avail myself of all modifications that may fall within the scope of the appended claims.

Having thus described my invention, what I claim is:

1. In an aircraft having a wing pivotally mounted thereon for tilting movement and provided with ailerons, the combination of a control member, and means operatively connecting said control member to said ailerons and including mechanism responsive to tilting of said wing to render said means inoperative.

2. In an aircraft having a wing pivotally mounted thereon and provided with ailerons, the combination of thrust producing means mounted on said wing on both sides of said aircraft, means for controlling the thrust of said thrust producing means, a control member, and means operatively connecting said control member to said thrust controlling means and to said ailerons, said connecting means including mechanism to render inoperative either of said operative connections.

3. In an aircraft having a wing pivotally mounted thereon and provided with ailerons, the combination of thrust producing means mounted on said wing on both sides of said aircraft, means for controlling the thrust of said thrust producing means, a changeover mechanism operatively connected to said ailerons and to said thrust controlling means, a control member, means operatively connecting said control member to said changeover mechanism, and means for positioning said changeover mechanism to provide for actuation of said ailerons in response to movement of said control member and for positioning said changeover mechanism to provide for actuation of said thrust controlling means in response to movement of said control member.

4. In an aircraft having a wing pivotally mounted thereon for tilting movement, the combination of a rudder, a control member, and means operatively connecting said control member to said rudder and including mechanism responsive to tilting of said wing to render said means inoperative.

5. In an aircraft having a wing pivotally mounted thereon for tilting movement, the combination of horizontally directed thrust producing means, means for controlling the thrust of said thrust producing means, a control member, and means operatively connecting said control member to said thrust controlling means and including mechanism responsive to tilting of said wing to render said connecting means inoperative.

6. In an aircraft having a wing pivotally mounted thereon for tilting movement, the combination of a rudder, horizontally directed thrust producing means, means for controlling the thrust of said thrust producing means, a control member, and means operatively connecting said control member to said thrust controlling means and to said rudder, said connecting means including mechanism responsive to tilting of said wing to render inoperative at least one of said operative connections.

7. In an aircraft having a wing pivotally mounted thereon for tilting movement, the combination of a rudder, horizontally directed thrust producing means, means for controlling the thrust thereof, a changeover mechanism operatively connected to said rudder and to said controlling means, a control member, means operatively connecting said control member to said changeover mechanism, and means responsive to tilting of said wing for positioning said changeover mechanism to provide for actuation of said rudder in response to movement of said control member and for positioning said changeover mechanism to provide for actuation of said thrust controlling means in response to movement of said control member.

8. In an aircraft having a wing pivotally mounted thereon for tilting movement, the combination of an elevator, a control member, and means operatively connecting said control member to said elevator and including mechanism responsive to tilting of said wing to render said means inoperative.

9. In an aircraft having a wing pivotally mounted thereon for tilting movement, the combination of vertically directed thrust producing means, means for controlling the thrust thereof, a control member, and means operatively connecting said control member to said controlling means and including mechanism responsive to tilting of said wing to render said connecting means inoperative.

10. In an aircratf having a wing pivotally mounted thereon for tilting movement, the combination of an elevator, vertically directed thrust producing means, means for controlling the thrust of said thrust producing means, a control member, and means operatively connecting said control member to said thrust controlling means and to said elevator, said connecting means including mechanism responsive to tilting of said wing to render inoperative at least one of said operative connections.

11. In an aircraft, the combination of an elevator, vertically directed thrust producing means, means for controlling the thrust of said thrust producing means, a changeover mechanism operatively connected to said elevator and to said thrust controlling means, a control member, means operatively connecting said control member to said changeover mechanism, and means for positioning said changeover mechanism to provide for actuation of said elevator in response to movement of said control member and for positioning said changeover mechanism to provide for actuation of said thrust controlling means in response to movement of said control member.

12. In an aircraft having a fuselage and a wing pivotally mounted thereon and provided with ailerons, the combination of thrust producing means mounted on said wing on both sides of said fuselage, means for controlling the thrust of said thrust producing means, a rudder, horizontally directed thrust producing means, means for controlling the thrust of said second thrust producing means, a first control member, means operatively connecting said first control member to said first thrust controlling means and to said ailerons, said connecting means including mechanism to render inoperative at least one of said operative connections, a second control member, and means operatively connecting said second control member to said second thrust controlling means and to said rudder, said last means including mechanism to render inoperative at least one of said last mentioned operative connections.

13. In an aircraft having a fuselage and a wing pivotally mounted thereon and provided with ailerons, the combination of thrust producing means mounted on said wing on both sides of said fuselage, means for controlling the thrust of said thrust producing means, an elevator, vertically directed thrust producing means, means for controlling the thrust of said second thrust producing means, a control member, means operatively connecting said control member to said first thrust controlling means and to said ailerons, said connecting means including mechanism to render inoperative at least one of said operative connections, and means operatively connecting said control member to said second thrust controlling means and to said elevator, said last means including mechanism to render inoperative at least one of said last mentioned operative connections.

14. The combination of claim 12 and including an elevator, vertically directed thrust producing means, means for controlling the thrust thereof, and means operatively connecting said first control member to said thrust controlling means and to said elevator, said connecting means including mechanism to render inoperative at least one of said operative connections.

15. In an aircraft, a wing pivotally mounted for tilting movement between positions for airplane flight and vertical flight, ailerons carried by said wing, variable pitch propellers mounted on said wing, a changeover mechanism operatively connected to said ailerons and to the pitch control of said propellers, a control member operatively connected to said changeover mechanism, and means responsive to tilting of said wing for positioning said changeover mechanism to provide for actuation of said ailerons in response to movement of said control member when said wing is in position for airplane flight.

16. In an aircraft, a wing pivotally mounted for tilting movement between positions for airplane flight and vertical flight, ailerons carried by said wing, variable pitch propellers mounted on said wing, a changeover mechanism operatively connected to said ailerons and to the pitch control of said propellers, a control member operatively connected to said changeover mechanism, and means responsive to tilting of said wing for positioning said changeover mechanism to provide for pitch change of said propellers in response to movement of said control member when said wing is in position for vertical flight.

17. In an aircraft, a wing pivotally mounted for tilting movement between positions for airplane flight and vertical flight, ailerons carried by said wing, variable pitch propellers mounted on said wing, a changeover mechanism operatively connected to said ailerons and to the pitch control of said propellers, a control member operatively connected to said changeover mechanism, and means responsive to tilting of said wing for positioning said changeover mechanism to provide for actuation of said ailerons in response to movement of said control member when said wing is in position for airplane flight and for positioning said changeover mechanism to provide for pitch change of said propellers in response to movement of said control member when said wing is in position for vertical flight.

18. In an aircraft, a wing pivotally mounted for tilting movement between positions for airplane flight and vertical flight, ailerons carried by said wing, thrust producing means mounted on said wing, means for controlling the thrust thereof, a changeover mechanism operatively connected to said ailerons and to said thrust controlling means, a control member operatively connected to said changeover mechanism, and means responsive to tilting of said wing for positioning said changeover mechanism to provide for actuation of said thrust controlling means in response to movement of said control member when said wing is in position for vertical flight, a second control member, and means operatively connecting said second control member to said thrust controlling means, said connecting means including means responsive to tilting of said wing for actuating thrust controlling means.

19. In an aircraft, a wing pivotally mounted for tilting movement and provided with ailerons, thrust producing means mounted on said wing, means for controlling the thrust thereof, a first control member, means operatively connecting said first control member to said thrust controlling means and to said ailerons, said connecting means including mechanism to render inoperative at least one of said operative connections, a horizontally disposed fan having adjustable pitch blades, means operatively connecting said first control member to the pitch control of the blades of said horizontally disposed fan, a vertically disposed fan, a second control member, and means operatively connecting said second control member to the pitch control of the blades of said vertically disposed fan.

20. In an aircraft, the combination of a rudder, horizontally directed thrust producing means, means for controlling the thrust of said thrust producing means, a control member, means operatively connecting said control member to said thrust controlling means and to said rudder, said connecting means including mechanism to render inoperative at least one of said operative connections, an elevator, vertically directed thrust producing means, means for controlling the thrust thereof, a second control member, and means operatively connecting said second control member to said last mentioned thrust controlling means and to said elevator, said last means including mechanism to render inoperative at least one of said last mentioned operative connections.

References Cited in the file of this patent

UNITED STATES PATENTS

| | | |
|---|---|---|
| 2,518,012 | Horkey | Aug. 8, 1950 |
| 2,601,458 | Robert | June 24, 1952 |
| 2,621,001 | Roman | Dec. 9, 1952 |
| 2,731,215 | Avery | Jan. 17, 1956 |

FOREIGN PATENTS

| | | |
|---|---|---|
| 252,266 | Great Britain | May 28, 1926 |